United States Patent [19]

Aschauer

[11] 4,313,533

[45] Feb. 2, 1982

[54] INTERLEAVED FRICTION PLATE TYPE CLUTCH HAVING CLUTCH COOLING PASSAGE MEANS INCLUDING A RESERVOIR, WEIR AND SLOT

[75] Inventor: George R. Aschauer, Racine, Wis.

[73] Assignee: Twin Disc, Incorporated, Racine, Wis.

[21] Appl. No.: 148,948

[22] Filed: May 12, 1980

[51] Int. Cl.³ .............................................. F16D 13/74
[52] U.S. Cl. ................................ 192/113 B; 184/1 R
[58] Field of Search .................. 192/70.12, 113 B; 74/467, 468; 112/256; 184/11 B, 1 R

[56] References Cited

U.S. PATENT DOCUMENTS

| | | | |
|---|---|---|---|
| 2,620,900 | 12/1952 | Du Rostu | 192/113 B |
| 3,088,567 | 5/1963 | Fischer et al. | 192/113 B |
| 3,202,253 | 8/1965 | Merritt et al. | 192/113 B |
| 3,500,661 | 3/1970 | Kohler et al. | 184/1 R |

Primary Examiner—George H. Krizmanich
Attorney, Agent, or Firm—James E. Nilles

[57] ABSTRACT

An interleaved friction plate clutch in which the interleaved clutch plates can be clampingly engaged to transmit power between the clutch elements. Passage means are provided for cooling and lubricating the surfaces of the clutch plates, which includes a series of circumferentially spaced and axially extending reservoirs located in the clutch hub and radially inwardly of the clutch plates and also including a radially extending slot which extends axially along the length of the reservoir and at one side of the reservoir so as to form a weir therewith in which cooling fluid can accumulate and from which a layer of fluid can then flow over the weir along the entire length of the clutch assembly to thoroughly cool all of the clutch plates.

9 Claims, 9 Drawing Figures

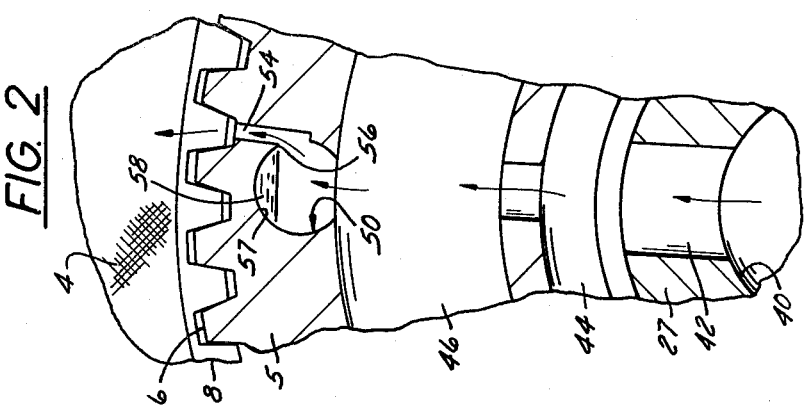
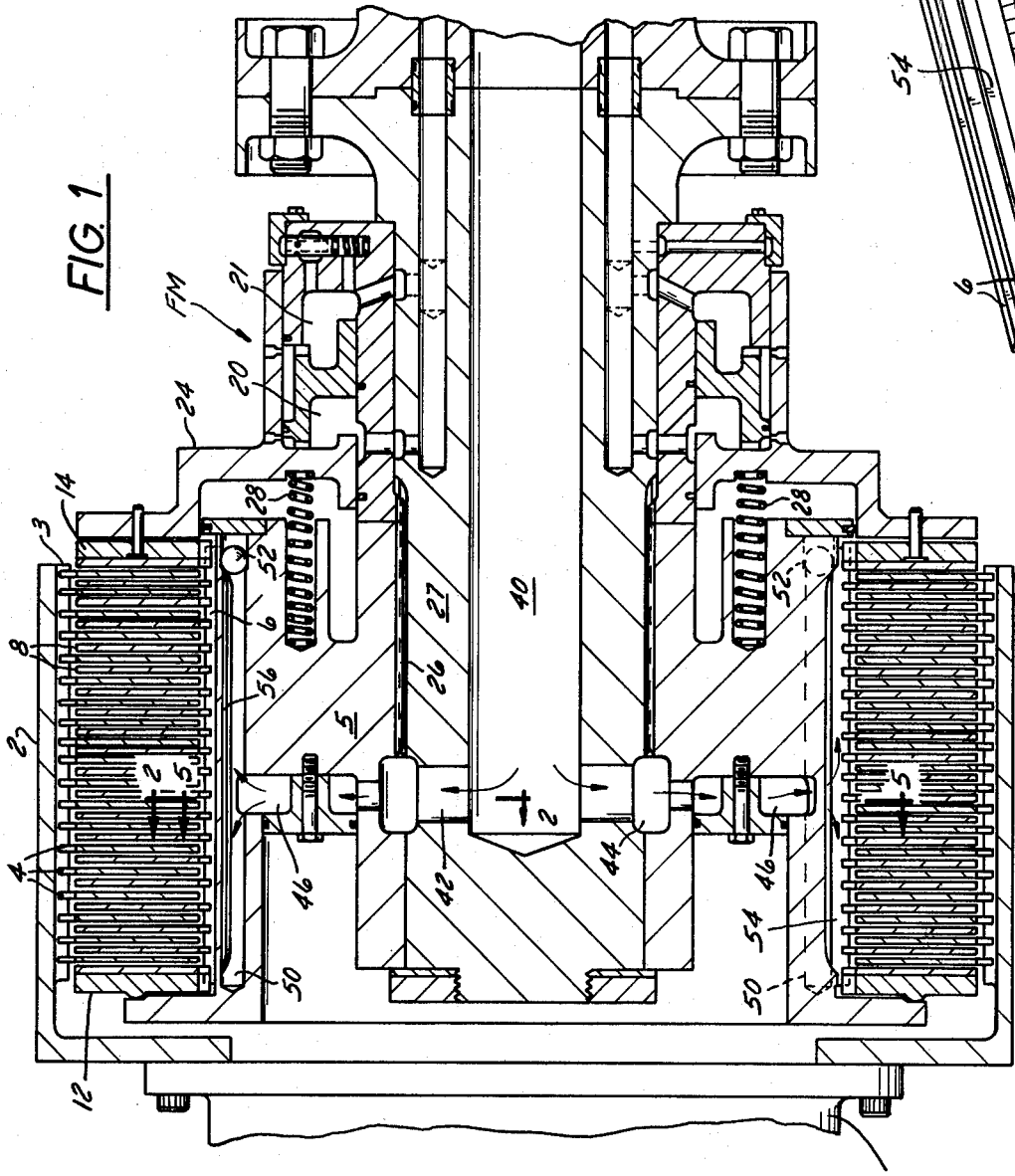
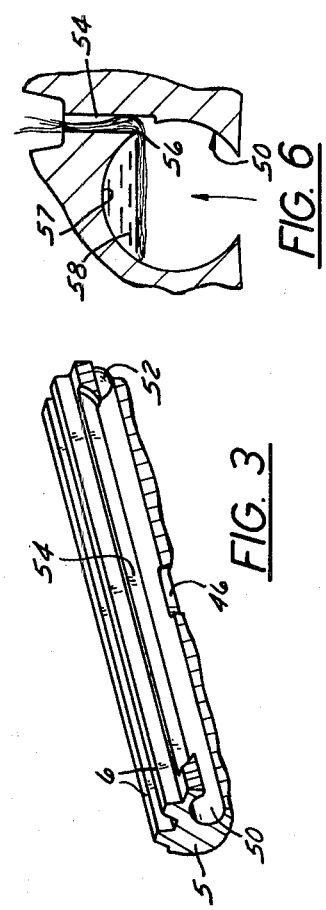

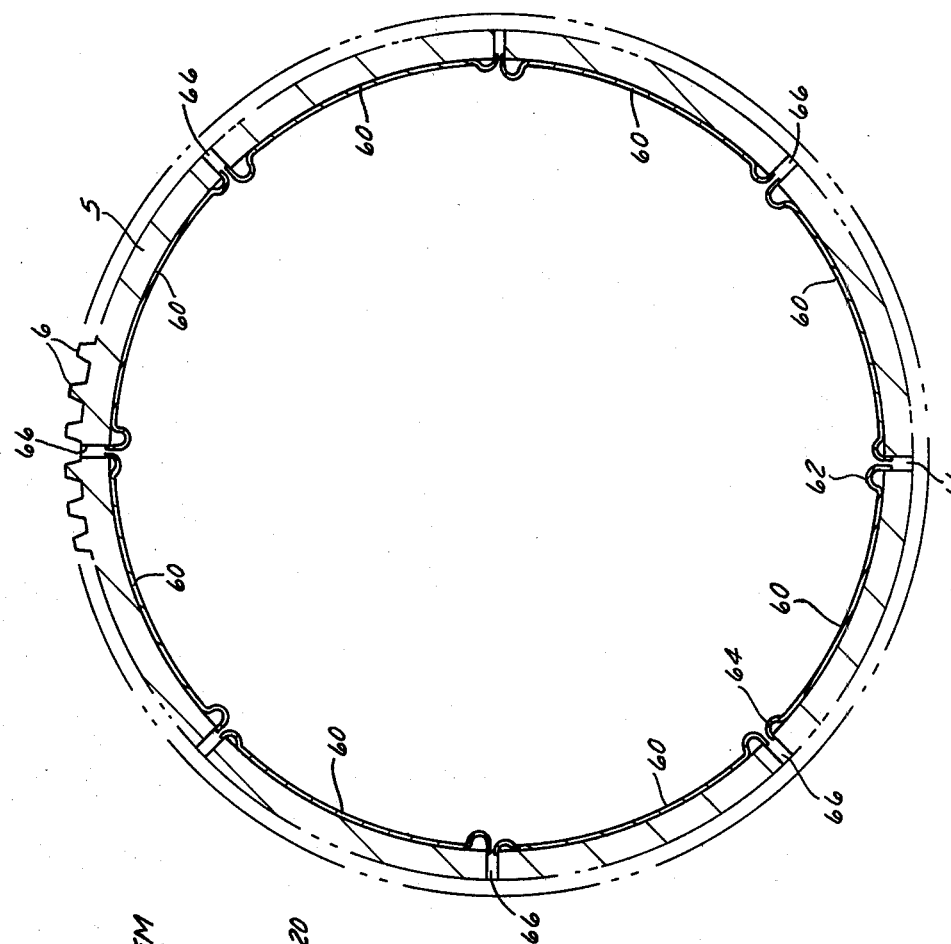
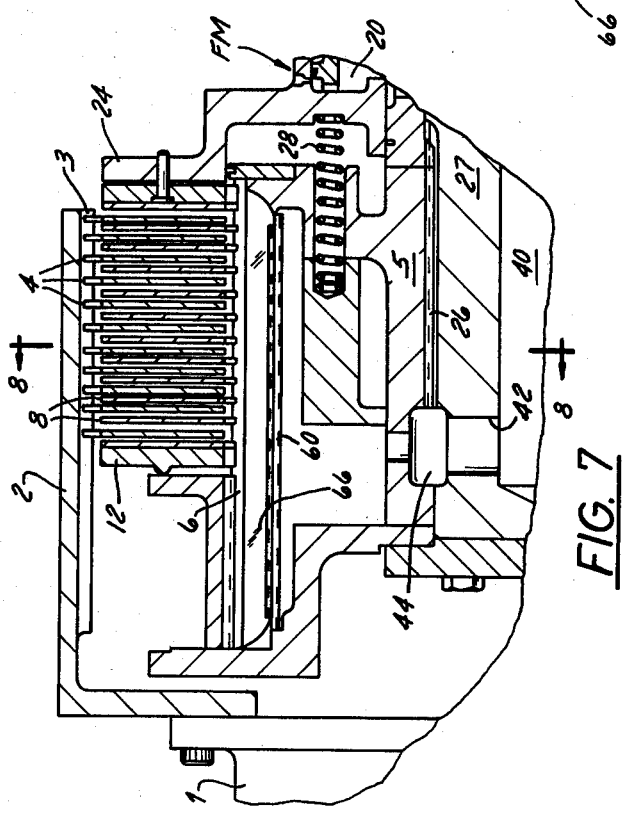
FIG. 7
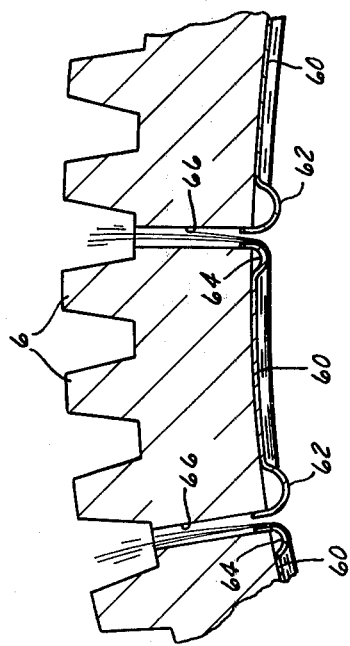
FIG. 8
FIG. 9

INTERLEAVED FRICTION PLATE TYPE CLUTCH HAVING CLUTCH COOLING PASSAGE MEANS INCLUDING A RESERVOIR, WEIR AND SLOT

BACKGROUND OF THE INVENTION

Various type of interleaved friction plate clutches having cooling means for the clutch plates have been proposed and used with certain degrees of success. An example of such cooling passage means is shown in U.S. Pat. No. 3,833,100 issued Sept. 3, 1974 and entitled "Control System for Power Transmission Clutch", and which is assigned to an assignee common with the present invention. That patent, as do many prior art structures, discloses a series of radially extending holes in the clutch hub which act to more or less haphazardly feed lubricating or cooling fluid to the clutch plates. However, due to the fact that the clutch plates are located at random locations with respect to the holes and furthermore due to the fact that these clutch plates are often slightly of non-flat or otherwise distorted shape lubricating fluid does not flow completely across all of the plates and in fact in many instances, certain spots on the clutch plates are completely dry. This results in overheating and burning up of the clutch plates.

Uniform distribution of fluid across the plates may be achieved by the use of excess quantities of oil, but this is uneconomical and presents other problems. Furthermore, particularly in large diameter clutches, the amount of cooling fluid necessary to cool the clutches has become excessive due to the large number of cooling passages and due to the high pressure of the oil flowing through the small cooling and lubricating passages. As a result, the total fluid flow in such clutches is often in the neighborhood of many hundreds of gallons of fluid per minute.

SUMMARY OF THE PRESENT INVENTION

The present invention provides an interleaved friction plate clutch having cooling passages therefor and which passages include a series of circumferentially spaced and axially extending reservoirs in the hub element of the clutch which are located inwardly of, but adjacent to the clutch plates. The cooling passages of the present invention also include a slot for each of the reservoirs which extends generally radially from the reservoir to conduct fluid from the reservoir through the slot and to the plates. The slot is formed at one side of the reservoir so that the intersection of the slot with its reservoir forms a weir over which a layer of oil can continuously flow along the entire length of the reservoir and clutch pack. With this arrangement, a smaller flow of fluid is required and insures that the entire surfaces of the clutch plates are completely cooled.

One aspect of the invention relates to a reservoir arrangement of the above type in which the reservoir is formed by axially extending, circumferentially spaced holes in the hub element of the clutch, and a radially extending slot for each hole that is formed at one side of its respective reservoir and extends axially along the length of the reservoir and off-set from the center of the hole so that the inner section of the slot with the hole forms the weir under which the layer of fluid can pass.

Another aspect of the invention relates to a reservoir being formed from a series of stamped, cast or otherwise formed curved metal pieces, or from a single continuous piece, secured to the inner cylindrical surface of the clutch hub element, each piece having a dam formed along one of its axially extending edges and a weir formed along the opposite axially extending edge.

These and other objects and advantages of the present invention will appear hereinafter as this disclosure progresses, reference being had to the accompanying drawings.

BRIEF DESCRIPTION OF THE DRAWINGS

FIG. 1 is a longitudinal, cross-sectional view through a clutch embodying the present invention;

FIG. 2 is an enlarged, transverse sectional view through the clutch lubricating passageway, the view being taken generally along the line 2—2 in FIG. 1;

FIG. 3 is a fragmentary, perspective view of a portion of the reservoir in the form of a hole and slot passage means shown in FIG. 1, certain parts being broken away for the sake of clarity;

FIG. 6 is an enlarged, fragmentary view, in cross section, of the reservoir and slot passage means shown in FIG. 2, and more clearly showing the layer of cooling fluid that flows under the weir and into the slot;

FIG. 7 to 9 show a modified form of the invention in which the reservoir is formed by an axially extending, curved sheet metal stamped piece having a dam along one of its edges and the weir formed along the other of its edges;

FIG. 7 is a view generally similar to a portion of FIG. 1, but showing the modified form of reservoir;

FIG. 8 is an enlarged, cross sectional view taken generally along the line 8—8 of FIG. 7; and FIG. 9 is an enlarged, fragmentary view of a portion of the showing of FIG. 8 and illustrating the layer of cooling oil as it flows over the weirs and into the slots.

DESCRIPTION OF PREFERRED EMBODIMENTS

Figure 5:
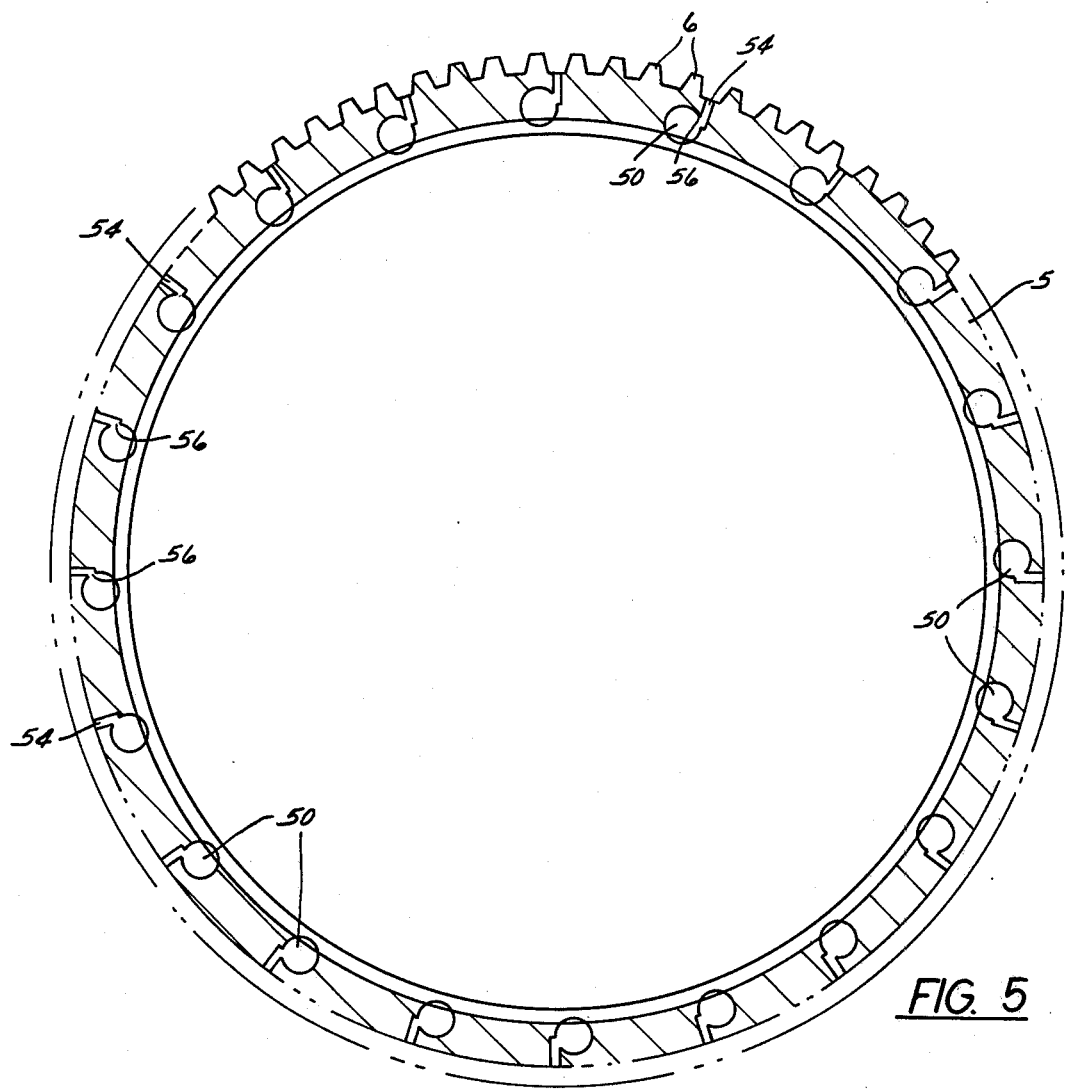
FIG. 5 is an enlarged, transverse sectional view taken through the clutch hub and showing the hole and slot passage means therein, the view being taken generally along the line 5—5 in FIG. 1.

A general organization of an interleaved friction type clutch with which the present invention finds utility is shown in the said U.S. Pat. No. 3,833,100 by way of example only, and as the construction and operation of the general components of such a clutch are conventional and well known, it is not believed necessary to describe them in detail. If a more complete description of such a clutch is deemed to be either necessary or desirable, reference may be had to said U.S. Pat. No. 3,833,100.

FIGURES 1-6

It is believe sufficient to say for purposes of this disclosure that a power input member 1 has a clutch drum 2 of cylindrical shape that contains internal axially extending splines 3. A series of clutch plates 4 having an external toothed periphery are engaged in the splines of the clutch drum for axial sliding movement within limits in the known manner. The clutch also includes a hub 5 having a series of external, axially extending splines 6 in which are mounted the internally toothed clutch plates 8 for limited axial sliding movement on the splines 6 of the hub. Plates 4 and 8 are interleaved and are capable of being clamped up tightly together for full clutch engagement or released from one another for a clutch disengaged position. Also, this clutch may be modulated, that is, the clutch plates may be clampingly engaged to any desired degree so that the clutch can be slidingly engaged and consequently the power delivered through the clutch can be modulated, also the known manner. The clutch includes a conventional back-up plate 12 and a conventional pressure plate 14, the latter of which is axially shiftable under the influence of a fluid pressure operating means FM. Pressurization of the actuating chambers 20 or 21 of the fluid means FM causes actuation of the piston 24 in the known manner to cause clutch engagement. A series of conventional springs 28 insure clutch release when the fluid means is not pressurized to cause clutch clamp-up and the springs 28 provide that minimal drag is present when the clutch is disengaged.

The hub 5 is drivingly connected by splines 26 to the output shaft 27 in the known manner and thus power can be transmitted between the input member 1 and the output shaft 27 or in the opposite direction as is known.

Lubricating fluid such as oil is used in clutches of this type to cool the friction plates, and this is necessary particularly when the clutch is being engaged, is running disengaged, or is being modulated, and such fluid is required to prevent the plates from becoming dry in spots and burning up. These plates must be lubricated across their entire surface to prevent hot spots from occurring which are extremely detrimental to clutch life. Heretofore it has been difficult to obtain complete cooling of the entire clutch surfaces due to the aforementioned reasons.

The purpose of the present weir cooling oil distribution arrangement for cooling the clutch plates is to provide uniform oil distribution in an axial direction throughout the clutch plate stack thereby requiring a lesser quantity of fluid flow of cooling oil.

The two important parameters for the weir of the present invention are (1) the mechanical weir height and (2) the height or thickness of the layer of oil passing under the weir. A formula that is used to generate the pressure or head is as follows:

$$P = 0.051 \times 0.032 \, N^2 \, (R1^2 - R2^2)$$

in which:

P = pressure in pounds per square inch;
0.051 is a constant
0.032 is the density of oil—lbs. per cubic inch of the hub
$N^2$ is revolutions per second
R1 and R2 are radii in inches of the weir and the inner side of the fluid layer, respectively.

With this formula, varying the speed of rotation and the thickness of the oil layer (difference between R1 and R2) we generate the pressure to cause flow over the weir.

Flow is defined by the formula $$Q = A \times \sqrt{2gh}$$

where:

Q is flow in cubic feet per second
A is area in square feed (cross section of the area of flow path under the weir
g is the conventional gravitational constant in feet per second squared
h is the head or pressure in feet The result in cubic feet per second flow is then converted into gallons per minute.

For example, a 24-inch diameter clutch of conventional design running at 3600 rpm with a weir construction, the diameter having a radius of 7.766 inches from the centerline of rotation and a layer of oil flowing under the weir of a thickness of 0.050, will discharge approximately 750 gallons per minute for an arrangement having twenty weir and slot passages per clutch.

In order to obtain the required oil flow, it is necessary to produce a head of oil in the weir and in order to obtain such a head, a layer of fluid flowing under the weir is required. In other words, a certain radial thickness of a layer cooling oil flowing under the weir is required in order to produce a head to produce the flow.

Cooling fluid passage means are provided in the clutch and may include a central passage 40 such as a rifle drilling in the shaft 27 and which communicates with cross ports 42 in the shaft, the annular passageway 44, annular passage 46 which intersects a series of axially extending holes 50 circumferentially spaced around the generally radially outer portion of the hub. These holes are blind at one end and may be plugged at the other end by means of the ball plugs 52. The cooling oil passage means of the present invention furthermore includes a series of slots 54 which are formed in the outer portion of the hub, and extend in a generally radial direction, one slot being provided for each hole 50. These slots extend axially co-extensively with the holes 50 and are located generally to one side thereof in a circumferential direction. More specifically as shown in FIG. 2, each slot 54 extends off-center from its respective hole 50 and intersects the side of its hole so as to form a weir 56 along the entire length of the hole. A reservoir 57 is thus formed at the radial outer portion of the hole. Cooling fluid 58 is collected in the reservoir and can flow under (radially under) the weir along its entire axial length, and along the length of its respective slot, so as to continually and evenly feed fluid along the entire interleaved clutch assembly. In other words, free access to the entire clutch surfaces of the assembly is provided for the fluid, and such complete access occurs regardless of the position or non-flatness or other deformities of the clutch plates, such as due to wear of the friction surfaces.

The oil as it is discharged from the center of the clutch by means of centrifugal force, is directed radially outwardly into the reservoir as indicated by the arrow in FIG. 6 for maintaining the height of the oil in the reservoir. Because of centrifugal force, the oil does not flow directly from the center of the cluch and into the slot but instead acts to continually replenish the reservoir.

As the layer of oil is discharged under the weir and into the slot, it substantially fills the radially inner end of the slot. However, as the oil progresses radially outwardly through the slot, it assumes a tapered line of flow in the slot as shown in FIG. 6, that is to say, the radially outer end of the slot is not filled completely across its width because the flow, as defined by the exact area at that speed, would be greater than the weir flow.

With the above arrangement, uniform flow of cooling fluid along the axial length of the entire clutch pack and over the entire surface of each plate is assured. With the present invention, the exact axial position of the plates, relative to the lubricating passage is not critical to good distribution of the fluid over the plates, nor are non-flat plates of consequence.

As a result, with the present inventions, a lesser flow of fluid is required to assure the elimination of hot spots on the plates, and considerable economy of manufacture and operation is achieved, particularly in large clutches and those operating at high speeds.

FIGURES 7-9

Figure 4:
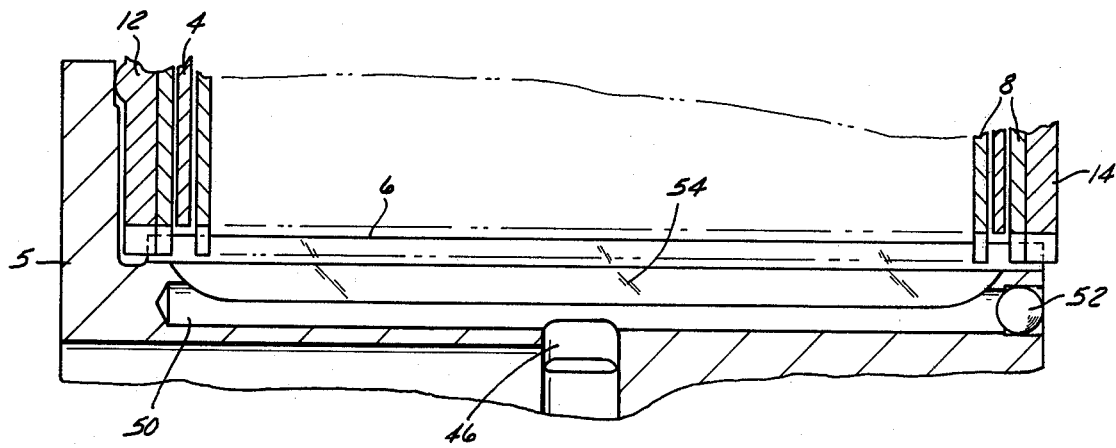
FIG. 4 is an enlarged, fragmentary view of a portion of the clutch passage means shown in FIG. 1.

The arrangement shown in FIGS. 7-9 has been similarly numbered to that shown in FIGS. 1-6 as far as common parts are concerned. The reservoir in this embodiment is formed by a series of curved, sheet metal pieces 60 which are located against and fixed within the inner cylindrical surface of the clutch hub. Each piece 60 has an inwardly extending raised portion 62 along one of its edges which forms a dam for the reservoir. Along the other axial edge of the piece 60 is another inwardly extending raised portion 64 that forms the weir. The reservoir is thus defined between the dam 62 and the weir 64, the weir 64 being of less height than the dam so that fluid in the reservoir will flow out of the reservoir and under the weir in a continuous layer of fluid. The dam on the other hand, being higher than the weir prevents flow of fluid thereover. As shown in FIG. 9, adjacent edges of adjacent pieces 60 extends into the slot 66 and are held therein in any suitable manner.

Thus, the reservoir is formed by having the weir 64 along one edge and adjacent the discharge slot 66 while at the other side of the reservoir spaced circumferentially from the weir, a dam 62 is located which is of a greater height than the weir to preclude flow of oil from the reservoir over the dam. The oil flows from the reservoir only under the weir and into the slot. With such a construction, manufacturing inaccuracies as to the height between the weir and the dam are tolerable and insure that a supply of oil is built up in the weir. The arrangement automatically provides for manufacturing errors or tolerances.

RECAPITULATION

With the present invention, the cooling oil is supplied with uniformity to each plate and is distributed completely along the entire axial length of the clutch and consequently smaller volumes of cooling fluid are required.

I claim:

1. An interleaved, friction plate type clutch comprising interleaved clutch plates adapted to be axially and releasably clamped together for engagement of said clutch, and a series of circumferentially spaced, cooling fluid passage means in said clutch and being in fluid communication with said clutch plates, each of said passage means including an axially extending reservoir having a generally co-extensive axially extending slot which intersects said reservoir at one side thereof so as to define a fluid weir at the juncture of said reservoir and said slot, said weir extending radially inwardly from said reservoir whereby fluid can flow from a generally central portion of said clutch to fill said reservoir and be held therein by centrifugal force and then flows over said weir and into said slot along the axial length thereof to cover said clutch plates.

2. An interleaved, friction plate type clutch comprising interleaved clutch plates adapted to be axially clamped together for engagement of said clutch, and cooling fluid passage means in said clutch and communicating with said clutch plates, said passage means including, a plurality of circumferentially spaced axially extending reservoirs located radially inwardly of said plates, and axially extending slots extending generally radially in said clutch, one slot for each of said reservoirs and intersecting a portion of its respective reservoir so as to be in fluid receiving communication and defining a fluid weir with its reservoir and extending axially along its reservoir, said slot intersecting its reservoir at a location radially inward of the radially outer extremity of its respective reservoir, said weir extending radially inwardly from said reservoir, whereby cooling fluid can flow from a generally central portion of said clutch and radially outward into said reservoir to fill said reservoir with cooling fluid and permit said fluid to flow under said weir and along the entire length of its reservoir to thereby cool the surfaces of said interleaved clutch plates.

3. An interleaved, friction plate type clutch comprising a clutch hub having circumferentially spaced external splines extending axially therealong, a series of friction plates having internal teeth slideably mounted in said splines of said hub, an outer clutch cylindrical member having a series of internal axially extending teeth circumferentially spaced therearound, a plurality of externally toothed clutch plates axially slideably mounted in said internal splines of said cylindrical member, the plates of said hub and said cylindrical member being interleaved and adapted to be axially clampingly engaged together for drivingly connecting said hub and said cylindrical member and means for selectively causing said plates to be clampingly engaged for clutch engagement or for being released in a clutch disengaged position, and passage means for cooling fluid for said clutch plates and extending radially in said clutch to communicate with said clutch plates, said passage means including, a plurality of axially extending reservoirs circumferentially spaced around said hub and located radially inwardly of said plates, and axially extending slot means for said reservoirs, said slot means also extending generally radially of said clutch and intersecting a portion of said reservoir so as to be in fluid receiving communication therewith and defining a fluid weir extending axially along said reservoir and also extending radially inward of the radially outer extremity of said reservoir whereby cooling fluid can flow from a generally central portion of said clutch and radially outwardly into said reservoir and permit said fluid to flow under said weir and along the entire length of said reservoir to thereby cool the surfaces of said interleaved clutch plates.

4. An interleaved, friction plate type clutch comprising interleaved clutch plates adapted to be axially and releasably clamped together for engagement of said clutch, and a series of circumferentially spaced, cooling fluid passage means in said clutch and being in fluid communication with said clutch plates, each of said passage means including an axially extending hole having a generally co-extensive axially extending slot which intersects said hole off-center thereof so as to define a fluid weir at the juncture of said hole and said slot, said weir extending radially inwardly from said reservoir to thereby define a fluid pocket located at the radial outer portion of said hole and adjacent said weir whereby fluid can flow from a generally central portion of said clutch to fill said fluid pocket and flow over said weir and into said slot along the axial length thereof to completely cool said clutch plates.

5. An interleaved, friction plate type clutch comprising interleaved clutch plates adapted to be axially clamped together for engagement of said clutch, and cooling fluid passage means in said clutch and communicating with said clutch plates, said passage means including, a plurality of circumferentially spaced axially extending holes located radially inwardly of said plates, and axially extending slots also extending generally radially in said clutch, one slot for each of said holes and intersecting a portion of its respective hole so as to be in fluid receiving communication and defining a fluid weir with its hole and extending axially along its hole, said slot intersecting its hole at a location radially inward of the radially outer extremity of its respective hole so that said weir extends radially inwardly from said reservoir so as to form a fluid pocket located in the radially outer portion of said hole, whereby cooling fluid can flow from a generally central portion of said clutch and radially outwardly into said hole to fill said radially outer fluid pocket of said hole with cooling fluid and permit said fluid to flow over said weir and along the entire length of its slot to thereby completely cool the surfaces of said interleaved clutch plates.

6. An interleaved, friction plate type clutch comprising a clutch hub having circumferentially spaced external splines extending axially therealong, a series of friction plates having internal teeth slideably mounted in said splines of said hub, an outer clutch cylindrical member having a series of internal axially extending teeth circumferentially spaced therearound, a plurality of externally toothed clutch plates axially slideably mounted in said internal splines of said cylindrical member, the plates of said hub and said cylindrical member being interleaved and adapted to be axially clampingly engaged together for drivingly connecting said hub and said cylindrical member and means for selectively causing said plates to be clampingly engaged for clutch engagement or for being released in a clutch disengaged position, and passage means for cooling fluid for said clutch plates and extending radially in said clutch to communicate with said clutch plates, said passage means including, a plurality of axial holes circumferentially spaced around said hub and located radially inwardly of said plates, and axially extending slot means for said holes, said slot means also extending generally radially of said clutch and intersecting a portion of said hole so as to be in fluid receiving communication therewith and also extending defining a fluid weir extending axially along said hole and radially inward of the radially outer extremity of said hole so as to form a fluid pocket located at the radially outer portion of said hole whereby cooling fluid can flow from a generally central portion of said clutch and radially outwardly into said hole to fill said radially outer portion of said hole with cooling fluid and permit said fluid to flow over said weir and along the entire length of said slots to thereby completely cool the surfaces of said interleaved clutch plates.

7. The clutch set forth in claim 1 further characterized in that said reservoirs are formed by a longitudinally extending cylindrical metal piece secured within said clutch and radially inwardly of said clutch plates.

8. The clutch described in claim 7 further characterized in that said metal piece is formed of a series of metal pieces of transversely curved shape which are arranged together to form a cylindrical shape.

9. The clutch set forth in claim 8 further characterized in that each of said metal pieces has a radially inwardly extending projection extending along one of its sides to form a fluid dam and also having a radially inwardly extending projection along its opposite longitudinal side and of lesser height than said dam to thereby form said weir over which fluid from said reservoir passes.

* * * * *